(12) United States Patent
Benedikt (10) Patent No.: US 7,300,239 B2
(45) Date of Patent: Nov. 27, 2007

(54) HOIST FOR LOADING AND UNLOADING OBJECTS ON A TRUCK BED

(76) Inventor: Wilhelm Alfred Benedikt, 780 Grouse Crescent, Kingston, Ontario (CA) K7P 1A2

( * ) Notice: Subject to any disclaimer, the term of this patent is extended or adjusted under 35 U.S.C. 154(b) by 0 days.

(21) Appl. No.: 10/477,805

(22) PCT Filed: May 13, 2003

(86) PCT No.: PCT/CA02/00685

§ 371 (c)(1),
(2), (4) Date: Nov. 14, 2003

(87) PCT Pub. No.: WO02/092387

PCT Pub. Date: Nov. 21, 2002

(65) Prior Publication Data

US 2004/0156703 A1 Aug. 12, 2004

(30) Foreign Application Priority Data

May 14, 2001 (CA) .................................. 2347561

(51) Int. Cl.
*B60P 1/00* (2006.01)
*B65F 3/00* (2006.01)
(52) U.S. Cl. ...................... 414/546; 414/477
(58) Field of Classification Search ............... 414/421, 414/477, 491, 498, 424, 546, 478, 492, 493, 414/555, 732, 680; 214/501, 505; 280/402
See application file for complete search history.

(56) References Cited

U.S. PATENT DOCUMENTS

| 3,825,137 | A | * | 7/1974 | Mackrill et al. ............ 414/498 |
| 3,942,664 | A | * | 3/1976 | Lemaire ...................... 414/469 |
| 4,009,791 | A |   | 3/1977 | Derain |
| 4,053,074 | A | * | 10/1977 | Lemaire ...................... 414/491 |
| 4,111,321 | A | * | 9/1978 | Webster ...................... 414/549 |
| 4,147,266 | A | * | 4/1979 | Corompt ...................... 414/480 |
| 4,175,904 | A | * | 11/1979 | Airaksinen .................. 414/421 |
| 4,344,731 | A | * | 8/1982 | Visa et al. ................... 414/471 |
| 5,018,932 | A | * | 5/1991 | Croisier ....................... 414/498 |
| 5,203,667 | A |   | 4/1993 | Yoneda et al. |
| 5,542,807 | A | * | 8/1996 | Kruzick ....................... 414/491 |
| 5,542,808 | A | * | 8/1996 | Chiron et al. ................ 414/498 |
| 5,601,393 | A |   | 2/1997 | Waldschmit |
| 5,620,296 | A |   | 4/1997 | McMahon et al. |

(Continued)

FOREIGN PATENT DOCUMENTS

DE      4138512      5/1993

(Continued)

*Primary Examiner*—Saul Rodriguez
*Assistant Examiner*—Gregory W Adams
(74) *Attorney, Agent, or Firm*—Wayne L. Lovercheck (57) ABSTRACT

A hoist for elevating cargo onto the bed of a truck includes a frame (11) which may be mounted to the truck bed, a platform or container (12) which is connected to the frame by a pivoting arm (9), and an arrangement of linkages for rotating the arm (9) to position the platform either on the truck bed or on a loading and unloading position resting on the ground behind the truck. A hydraulic ram (24) is connected to the arm (9) via the linkages, with the linkages being arranged to increase the effective "flow" of the arm to provide a long travel distance of the arm.

11 Claims, 6 Drawing Sheets

U.S. PATENT DOCUMENTS

| | | | |
|---|---|---|---|
| 6,039,527 A | 3/2000 | Myllari | |
| 6,152,674 A * | 11/2000 | Ogrodnick | 414/498 |
| 6,457,931 B1 * | 10/2002 | Chapman | 414/491 |
| 6,550,704 B2 * | 4/2003 | Johnson et al. | 241/101.2 |

FOREIGN PATENT DOCUMENTS

| | | | |
|---|---|---|---|
| FR | 2148964 | | 3/1973 |
| IL | 121758 A | * | 7/2000 |

* cited by examiner

HOIST FOR LOADING AND UNLOADING OBJECTS ON A TRUCK BED

FIELD OF THE INVENTION

This invention relates to hoists and more particularly to a hoist for elevating a load-bearing platform from the ground to an open bed of a pickup truck and for returning the platform to the ground.

BACKGROUND OF THE INVENTION

Pickup trucks and other vehicles having a cargo-carrying bed are commonly used to transport loads which are too heavy to be manually hoisted, for example, a user might wish to load a small and light vehicle such as a snowmobile, all terrain vehicles ("A.T.V.") or riding lawn mowers. Such loads are usually loaded onto the truck by pushing or driving them up a ramp and onto the open bed of the truck. Loading of the truck bed in this manner can result in damage to the vehicles or other objects being loaded and injury to persons loading them. An example is the case of loading a vehicle onto a truck bed, using a ramp. The upper edge of the ramp must typically rest solidly on the rear bumper of the truck while the vehicle is being driven up the ramp. If the upper edge overhangs the bumper somewhat, the ramp will become unstable when the weight of the front wheels of the vehicle being loaded is on the overhang. At this point, the ramp will rock and become unstable and the driver may lose control of the vehicle.

On the other hand, if the upper edge of the ramp overhangs the bumper insufficiently, vibration of the vehicle on the ramp may cause the upper edge to fall off the bumper with resulting damage to the vehicle and Injury to the driver.

Similarly, a heavy load such as a large hay bale is manually loaded onto a truck bed only with great difficulty.

It Is known to provide a hoist to assist in the loading or unloading of a truck, consisting generally of a cargo-carrying platform or container for resting on a truck bed and an arm for moving the platform between its travelling position on the truck bed and a loading position where it rests on the ground directly behind the truck. Thus, a heavy load can be readily pushed or driven onto the platform while the platform Is resting flat on the ground. The load is then secured and the platform hoisted onto the truck bed. An actuator such as a hydraulic ram, linked to an arm, moves a platform between the travel position supported on the truck bed and loading/unloading position resting on the ground. For example, U.S. Pat. No. 4,175,904 to Airaksinen discloses a container and associated hoist mechanism, whereby the container is moved by an arm between a position on a truck bed and resting on the ground directly behind a truck bed, with the hoist arranged for moving the container between the two positions. Similar arrangements are disclosed in U.S. Pat. No. 5,601,393 to Waldschmitt and U.S. Pat. No. 6,152,674 to Ogrodnick.

It is desirable to provide a hoist, including an associated container or platform, suitable for use with a relatively light vehicle such as a light truck or pickup truck, which is also capable of bearing and hoisting a relatively heavy load such as a pair of snowmobiles.

SUMMARY OF THE INVENTION

The present invention relates to an improved hoist which includes a moveable load-bearing platform which is moveable between a truck bed and a position resting at ground level, and further to a linkage arrangement for moving the platform.

I have invented an improved hoist that will elevate a platform from the ground to an open bed of a truck such as a pickup truck. A vehicle such as a snowmobile, an A.T.V. and a riding mower can be driven onto the platform while the platform is resting solidly on the ground. The driver can then get off the vehicle and the platform. The hoist will then safely elevate the platform, bearing the vehicle resting on the platform and place these onto the open bed of the pickup. The vehicle is then In position to be transported on the pickup. Reversing the action of the hoist allows the vehicle to be unloaded from the pickup.

Briefly the hoist of my Invention includes a moveable load-bearing platform, a framework adapted to be mounted on the open bed of a truck and having a longitudinally extending stringer; a cantilever arm pivotal relative to the stringer and being pivotally interconnected to the platform; and an actuator which is pivotal relative to the stringer and which, when retracting, causes the cantilever to pivot toward the actuator with resulting raising of the platform. The actuator comprises a longitudinally extending member such as a hydraulic ram. An arrangement of linkages connects the actuator with the cantilever arm to increase the leverage and "reach" of the actuator thereby permitting the actuator to be relatively short in comparison with the travel distance required of the cantilever arm. For example, it is desirable to provide a sufficient movement of the cantilever arm to lower the platform significantly below the truck wheels. This permits loading of watercraft, or of the platform on an irregular surface. The linkage arrangement comprises a first connecting link member interposed between the actuator and the cantilever arm, this first link member being pivotally joined at a first end to the actuator. The second end of the link member is pivotally engaged to the cantilever arm, at a point close to the pivot mount of the cantilever arm to the stringer. A second, generally upstanding anchoring link is pivotally mounted at its lower end to the stringer, at a point between the actuator and the cantilever arm. At its upper end the upstanding link is pivotally joined to the pivot mount joining the actuator and the first link. The actuator and first link form a scissors-like arrangement which unfolds as the actuator extends, thus increasing the "reach" and lifting force of the actuator. The second link serves to maintain longitudinal rigidity of the link system, i.e. to permit the horizontal thrust of the actuator to be transmitted to the cantilever arm.

In one preferable version, the links are arranged such that they meet at an elbow junction at approximately a 90 degree angle when the actuator and cantilever arm are extended for depositing the platform at ground level. In this position, a retractive force of the actuator may be translated into an upward lifting action of the second link arm acting on the main cantilever arm. The second link arm joins with the cantilever arm at an angle of between 45 and 90 degrees when in this extended position, thereby enhancing the upward lifting and Inertial action of the actuator. This shallow angle is desirable to permit the first link to transfer the weight of the cantilever arm against the frame when the actuator retracts or extends.

Preferably, the platform includes a at least one roller or wheel mounted at its distal end, to facilitate fore and aft movement of platform as the same as loaded and unloaded. A further desirable feature is fore and aft upstanding members at the respective fore and aft ends of the frame, for elevating and supporting the platform above the truck bed, thus permitting space between the truck bed and the platform for the various linkages and actuator. The rearward (aft) member desirably includes one or more rollers to ease the sliding of the platform over the rearward supporting member.

Directional references such as "horizontal" and "vertical" are used for convenience of description. It will be understood that such references are used in relation to the device on a substantially horizontally-disposed truck, and that such terms also include a reasonable and mechanically-effective range of angles or positions.

Expressions herein such as "substantially" or "approximately" in reference to dimensions and angles of the invention, cover a range of plus or minus 20% of any expressed length or 15° from any expressed angle.

DESCRIPTION OF THE DRAWINGS

The hoist of the invention is described with reference to the accompanying drawings and photographs. In the drawings.

Like reference characters refer to like parts through-out the description of the drawings.

DESCRIPTION OF PREFERRED EMBODIMENTS

Figure 1:
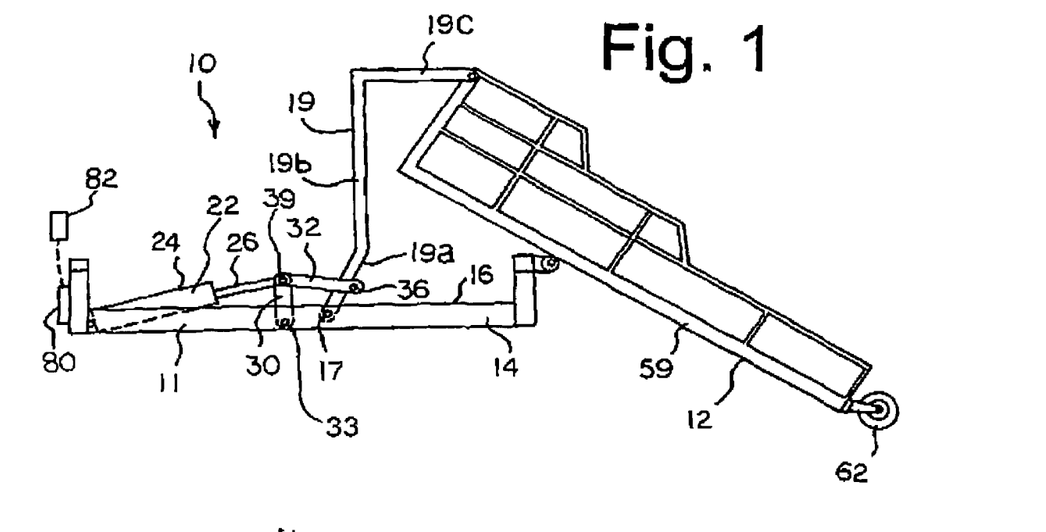
FIG. 1 is an elevation of the hoist in combination with a platform.
Figure 2:
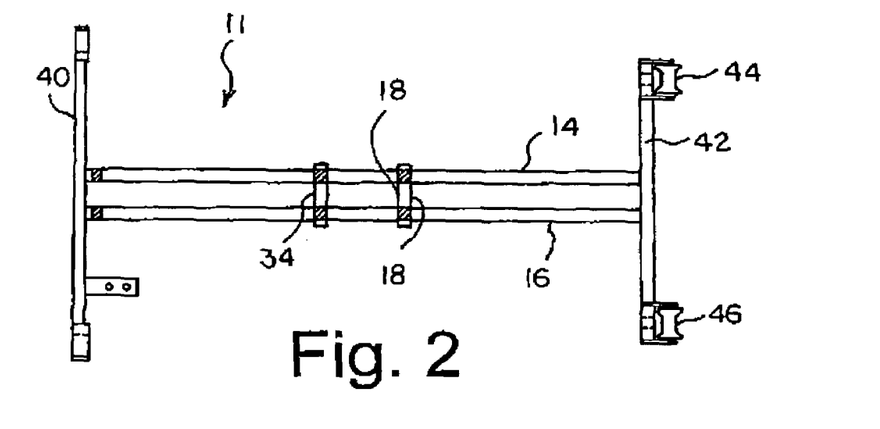
FIG. 2 is a plan view of the lower framework of the hoist.
Figure 8:
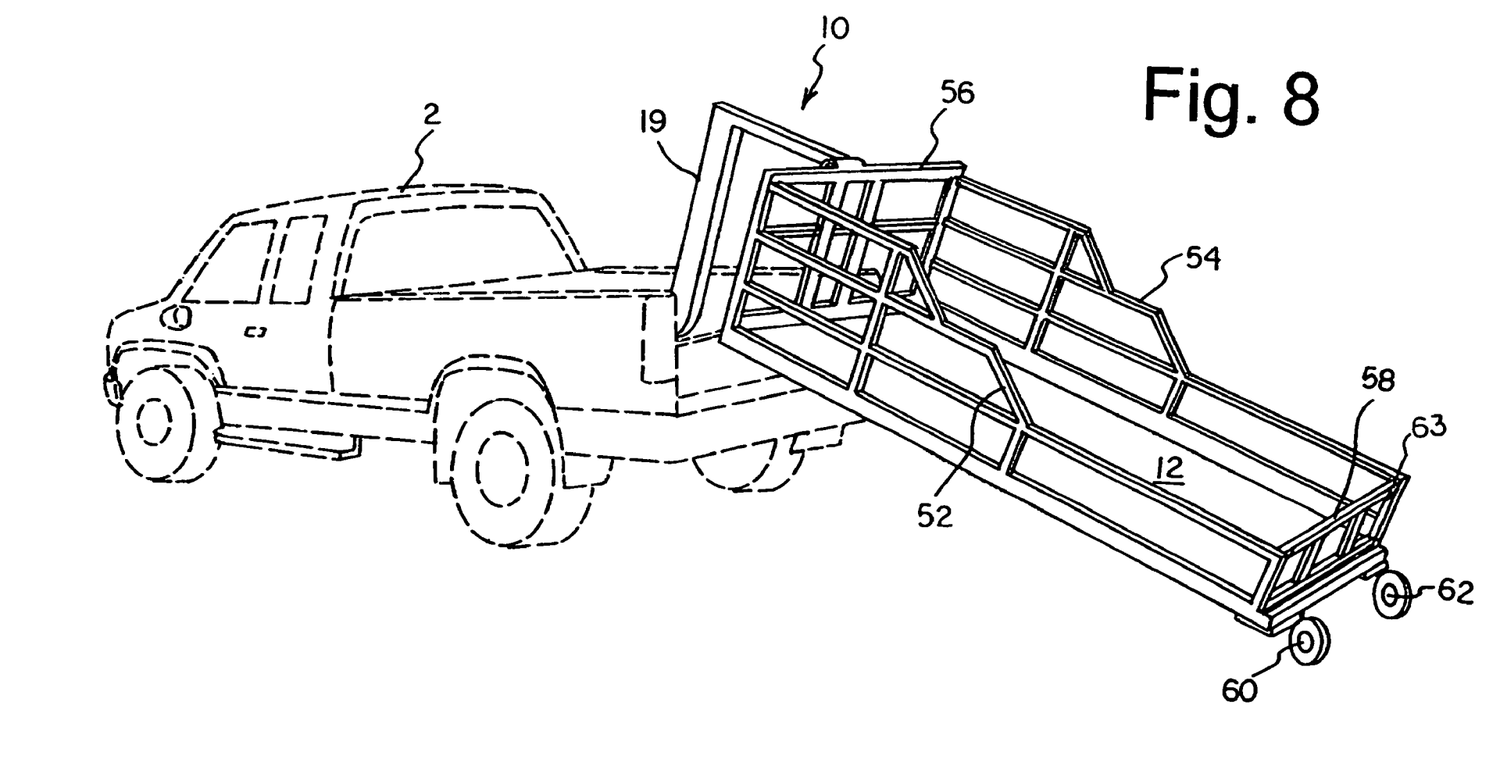
FIG. 8 is a perceptive view of the device mounted in a bed of a pickup truck, showing in particular the platform portion.

With reference to FIGS. 1, 2 and 8 the hoist of the invention, generally 10, is shown in conjunction with a platform, generally 12. The hoist has a lower framework 11 which includes a pair of stringers 14, 16, which are fastened to the open bed of a pickup 2 and extend longitudinally from the forward wall of the box adjacent to the cab of the vehicle to the rear edge of the bed. The lower framework is sized to conveniently fit within the bed of a pickup truck. It will be seen that the frame can be scaled up or down in size to permit mounting on a desired vehicle size. The frame is preferably removably mounted by the truck bed, for example by bolting to the truck bed. The invention is illustrated and described herein in association with a conventional pickup truck. It will be understood that any vehicle having a suitable bed will accommodate the invention.

Figure 7:
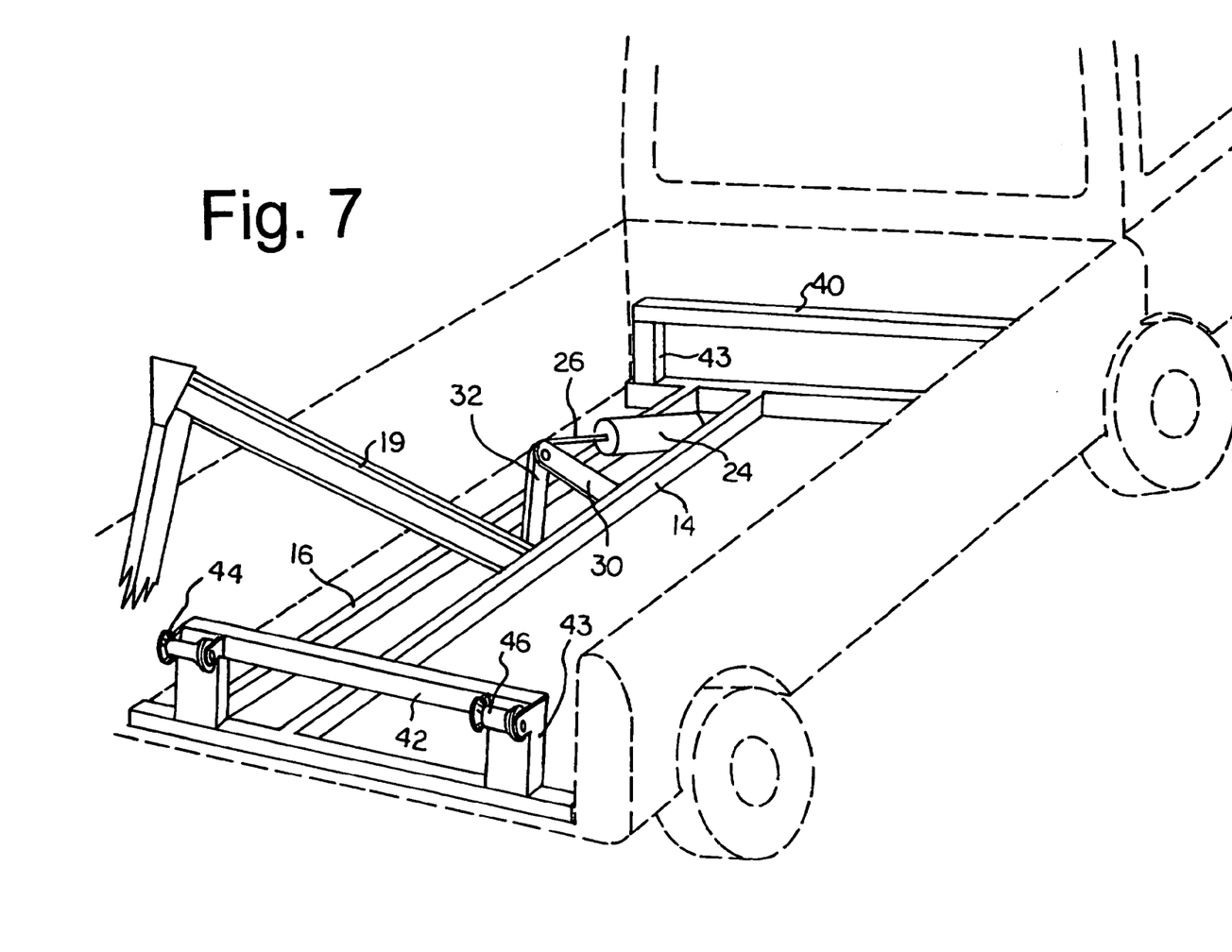
FIG. 7 is a perceptive view of the hoist position of the device, with the platform not shown, in perceptive, mounted to the bed of a pickup truck.

As illustrated in FIGS. 7 and 8, the rear gate of the pickup 2 is removed to accommodate the hoist and platform of the invention.

Transverse stringers 18 extend between the two stringers 14 and 16. The frame including stringers and connecting rods define a substantially horizontal plane when mounted. A cantilever arm 19 is pivotally mounted to the transverse stringers 18 between the two stringers 14, 16 at first pivot mount 17. The cantilever is a rigid unitary member comprising of three interconnected segments, an inner segment 19*a*, an intermediate segment 19*b* and an outer segment 19*c*. The first angle, between the intermediate and outer segments is about 90 degrees while the second angle, between the inner and intermediate segments is about 160 degrees. While the preferred first angle is about 90 degrees, it is contemplated that a range of angles would be suitable, for example, between 60 degrees and 120 degrees. An angle of substantially 90 degrees is preferable to permit the cantilever to fit snugly against front wall of the platform 12 when the platform is in the "travel" position on the truck bed (e.g. FIG. 4). It will be seen that the platform may include a front wall which is canted away from the vertical, and this would lead to a preference that the angle of the cantilever arm between the intermediate and outer segments is correspondingly changed. The second angle, between the intermediate and inner segments of the cantilever, may range between 180 and 140 degrees. The provision of an angle at this position is desirable for permitting the arrangement of linkage, described below, to effectively operate. However, if the first angle is adjusted suitably to other than 90 degrees, it is contemplated that the second angle may be about 180 degrees. The cantilever arm may comprise a rigid metal beam, having a box-like or I-beam cross-sectional configuration.

An actuator 22 is pivotally mounted to the stringers adjacent to their forward ends. As is conventional, the actuator is preferably a hydraulic cylinder 24 with a piston 26 which slides in the cylinder. The free end of the piston 26 is pivotally connected at 39 to first and second links 30, 32. The first link is pivotally connected at pivot mount 33 to rod 34 which extends between the stringers and effectively pivotally joins the link 30 to stringers 14 and 16. The second link is pivotally connected to the cantilever at 36.

Figure 3:
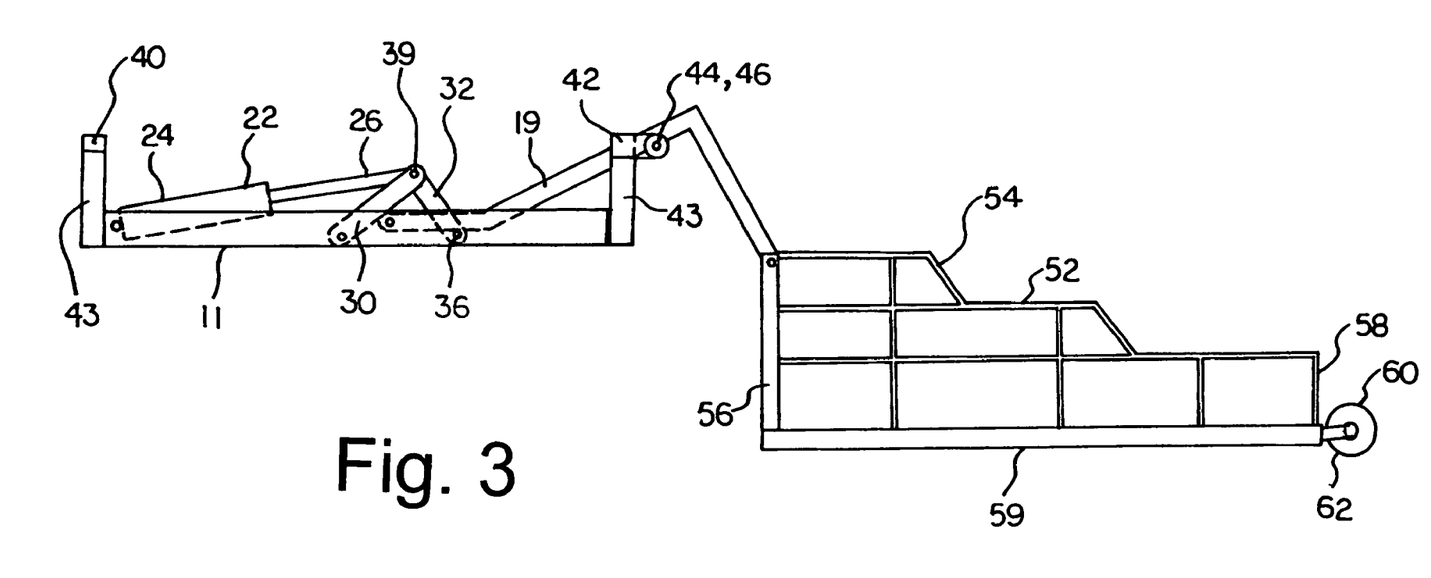
FIG. 3 is an elevation of the hoist and the platform in position to be loaded.

The links 30 and 32 are arranged to increase the lifting power of the actuator 22 for rotating the cantilever arm 19. In particular, the purpose of the links is to convert a generally horizontal force of the actuator, into a substantially vertical force for retracting the cantilever arm, particularly when the arm 19 is in the fully extended position. For this purpose, the links are arranged such that the first link 30 is mounted to the frame at a position between the actuator and the cantilever arm pivot mount, and the second link 32 is mounted to the cantilever arm 19 at a position removed from its base 17. As will be seen in FIG. 3, when the arm 19 is generally fully extended, the first and second links meet at a substantially right angle at pivotal interconnection 39 The first link 30 is about the same length as the second link 32, thereby permitting the links to be disposed at about the same angle (i.e. about 45 degrees from the horizontal), when the arm is in the extended position as seen in FIG. 3. This reasonably shallow angle permits the first link to transfer a forward Thrust in an efficient manner to the frame, when the actuator is retracted. This permits the links to provide lift and inertia to the arm 19 as the actuator 22 is retracted (and similarly as the actuator 22 is extended to lower the arm 19). The linkage arrangement also makes it easier for the actuator 22 to be stopped at any position between the extended and retracted positions. It will be seen that a preferred system provides for the links 30 and 32, and their respective contact points to be arranged such mat the second link meets the segment 19(*a*) at an angle of between about 35° and 90° from the vertical, when the inner segment 19A of the arm 19 is horizontal. As-suitable A suitable arrangement provides an angle of about 45° It will however be seen that the right angle is not critical and the links may meet at a range of angles when the segment 19A is horizontal and still serve their desired function. Further, the arm 19 may extend further downwardly from the position shown at FIG. 3, with the links 30 and 32 and actuator 22 rotating downwardly in a corresponding fashion. In effect, the first and second links define a folding arm with a pivotal elbow. The elbow is defined by pivot joint 39, with the free end of the piston 26 being pivotally joined to the arm at the elbow joint. The elbow joint 39 may comprise a single pivot connecting the actuator arm and the two links, or alternatively it may comprise two spaced apart pivots.

A tetragon is thus formed by the links 30 and 32, portions of the frame 11 defined by the horizontal plane, and the arm 19. Effectively all four arms of the tetragon are rigid and pivotal relative to each other.

In one example, the extended actuator length is 47⅞ inches, the first link has a pivot-to-pivot length of 11.5 inches and the second link has a pivot-to-pivot length of 12 Inches.

Figure 5:
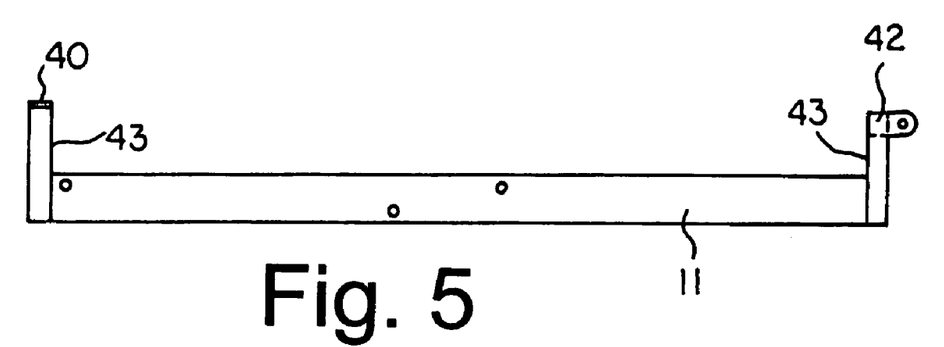
FIG. 5 is an elevation of the lower framework from the side.
Figure 6:
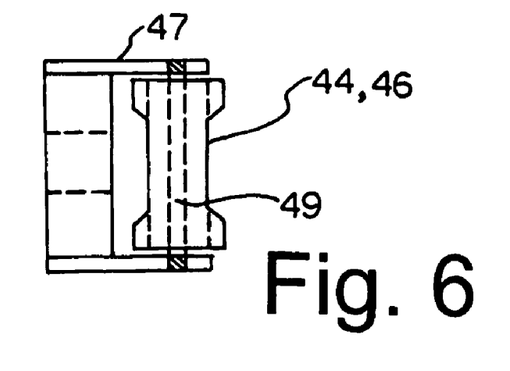
FIG. 6 is a plan view of a roller illustrated in FIG. 2, In enlarged scale.

With reference to FIGS. 2, 5 and 6, a transverse bar 40 extends upwardly from the forward ends of each stringer and a second transverse bar 42 extends upwardly from the rear ends of each stringer. The bars are mounted to upstanding supports 43. Rollers 44, 46 are mounted at the upper ends of the latter bars. The bars 40 and 42 provide a support for the platform. The rollers are preferably journalled in a conventional roller bearing mount, on axles 49. Axle mounts 47 support the rollers on the bar 42. The rollers have a generally hourglass shape to permit the platform rails 61 to "track" on the rollers as the platform slides on or off the truck bed.

Figure 9:
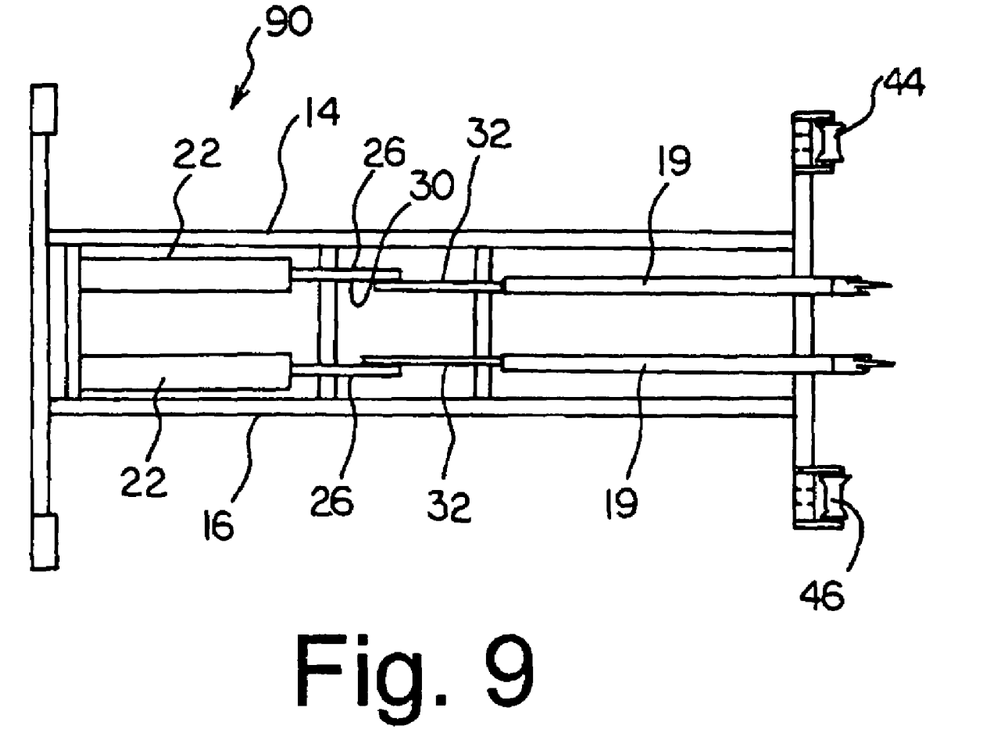
FIG. 9 is a plan view of a second embodiment of the hoist.

The hoist illustrated in figures has a single cantilever. In a second embodiment, at FIG. 9, the hoist 90 has two cantilever arms 19 and associated actuators 22 and links 30, 32 In a paired side-by-side arrangement. The number of cantilevers is a matter of choice and will depend upon such factors as the proposed maximum loaded weight of the platform, the distribution of the weight and so on.

With reference to FIGS. 3 and 8, the platform 12 includes side walls 52, 54, a front wall 56, a rear gate 58 and rollers or wheels 60, 62 which extend from the rear of the platform. A pair of side rails 59 forms part of the lower framework of the platform. The outer end of cantilever 19 is pivotally connected to the front wall of the platform by way of pivot mount 20. The platform bed may include apertures to receive vehicle wheel blocks to prevent the carried vehicle from rolling. The platform may also include anchors to hold tie-downs to stabilize a load on the platform. The rear gate 58 swings open about either side or bottom-mounted hinges to permit a vehicle to be driven onto the platform or a load to be rolled or slid thereon. Alternatively, the rear gate 58 may be lifted out of side brackets 63 for complete removal.

The elevated front and rear transverse bars 40, 42 to support the platform 12, elevated above the linkages and hydraulic ram of the hoist.

The operation of the hoist is as follows: The platform 12 is positioned to rest on the ground directly behind the truck. As seen in FIG. 3. For this purpose, the actuator 22 is extended, thereby rotating the arm 19 into its extended position. The load to be carried by the truck is then placed on the platform. If, for example, the load is a snowmobile or an A.T.V., the vehicle is driven onto the platform. The rear gate 58 of the platform is then closed. The vehicle, or other load, is secured to the platform by means of wheel blocks, tie downs or other suitable securing means.

The actuator is then activated to retract the piston. As the piston retracts, the first and second links fold together and the cantilever arm is rotated forwardly. As the actuator 22 is retracted, the thrusting retractive force of the piston 26, which is disposed in a near horizontal position, is converted by means of the links 30 and 32 into a generally upward retractive force in the manner explained above. The leading edge of the platform is drawn forwardly and upwardly, with the rails 61 of the platform sliding over the rollers 44, 46, as illustrated In FIG. 1. The rear edge of the platform is supported by wheels 60, 62. When the platform reaches the position illustrated in FIG. 1, the rails of the platform contacts rollers 44, 46 and the platform then rolls forward in the box of the pickup, with continued forward movement of the platform causing the wheels 60 and 62 to leave the ground until the platform is fully supported in a generally horizontal position on the transverse bars 40 and 42.

Preferably, a control unit 80 (see FIG. 1) is provided which controls the operation of the actuator. The control unit includes conventional controls from controlling a hydraulic ram, including a remote unit 82 (seen in FIG. 1 as connect4ed by a dotted line to the control unit 80) for actuation by a user standing a long side or behind the truck. The control unit may include an emergency shut-off switch which is triggered by e.g. a sudden increase in load indicative of a jam. The remote unit may include a "dead man" switch. The control unit and hydraulic ram are powered from the truck electric power supply, either by way of a cigarette lighter attachment or a dedicated electrical connection.

Figure 4:
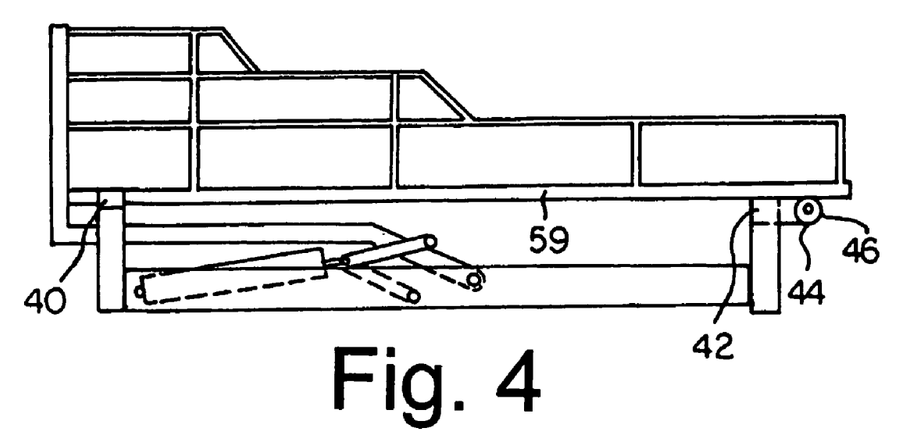
FIG. 4 is an elevation of the hoist and the platform in position to be transported.

When the outer segment 19c of the cantilever is vertical as illustrated in FIG. 4, the platform will be horizontal and fully supported by the bars 40, 42. Preferably, the platform then will be retained within the confines of the truck bed and not overhang the truck edges.

It will be seen that any suitable vehicle may be used in association with this invention for carrying the hoist, such as a flat-bed truck, a farm or construction vehicle, a towed vehicle such as a flat-bed trailer, and any other suitable vehicle.

It will be understood that modifications can be made in the embodiments of the hoist illustrated and described herein without departing from the scope and purview of the invention.

I claim:

1. A pickup truck and a bolt-on removably mounted hoist unit for loading and unloading objects to said pickup truck bed from positions significantly lower than ground level;

said hoist comprising: a frame, a platform and a moving structure system;

said frame comprising two or more stringers for mounting adjacent to and overlying said pickup truck bed in a generally horizontal orientation when mounted and defining a substantially horizontal plane;

said platform being suitable for carrying an object, said platform being displaceable between a first position supported on said pickup truck bed and a second position rearwardly and downwardly displaced from said pickup truck bed;

said second position may be near or well below ground level to load or unload said object thereon;

said moving structure comprises a rigid L-shaped doglegged cantilever arm, an extendible ram and a linkage system;

said rigid L-shaped dog-legged cantilever arm for moving said platform between said first and second positions having a first end pivotally mounted to said platform adjacent said upper first end of said platform and having a second end pivotally mounted to a rod extending between two said stringers at a point where said cantilever arm will not engage said pickup truck bed as said cantilever arm moves through a range of motion;

a single longitudinally extendible ram having first and second ends, said first end being pivotally mounted to a forward region of said frame, said second end indirectly connected to said cantilever arm for rotating said cantilever arm;

said cantilever arm having a 90 degree bend spaced from said first end thereof so that when said platform is in said first position, said cantilever arm extends generally vertically from said pivotal connection to said platform to a point below said platform and above said stringers where said cantilever arm extends generally horizontally below said platform; and, said cantilever arm has a second bend spaced from said second end to position said second end of said cantilever arm at said pivotal attachment on said stringers;

a linkage system for indirectly connecting said second end of said ram to said cantilever arm, said linkage system comprising first and second elongate rigid links, a first pivot mount joining together said first and second links of said ram about a single axis of rotation, and second and third pivot mounts joining said first and second elongate rigid links to said stringers and said cantilever arm respectively, wherein said first and second links, a portion of said cantilever arm and said horizontal plane of said stringers respectively define four sides of a tetragon all four sides of which are pivotal relative to each other, said ram being positioned fully forward of said rigid links when folded, said first link being pivotally mounted to said stringers between said ram and said cantilever arm for rotating between a rearwardly leaning position when said ram is fully extended, an intermediate vertical position and a forwardly leaning position when said ram is fully retracted, and said second link directly joining the second end of said ram and said cantilever arm for transmitting force therebetween, said first link being positioned and configured such that in said rearwardly leaning position the angle between said first and second links is about 90 degrees; and wherein extension and retraction of said ram actuates said linkage system and said cantilever arm to move said platform between said first and second positions.

2. The pickup truck and said bolt-on removably mounted hoist as defined in claim 1, wherein said cantilever arm is generally L-shaped dog-legged comprising a longest central portion, a medium length first end portion of said cantilever arm being engaged to said platform, and a shortest length second end portion of said cantilever arm engaged to said stringers.

3. The pickup truck and said bolt-on removably mounted hoist as defined in claim 1, wherein said links are arranged such that said angle between said second link and said arm is about 45 degrees when said arm is horizontal and extended rearwardly towards said second position.

4. The pickup truck and said bolt-on removably mounted hoist as defined in claim 1, wherein said first and second rigid links are substantially equal in length.

5. The pickup truck and said bolt-on removably mounted hoist as defined in claim 1, wherein said second rigid link is pivotally mounted to said arm at a position which is close to said second end of said arm relative to said first end.

6. The pickup truck and said bolt-on removably mounted hoist as defined in claim 1, wherein said ram comprises a base with an extendible ramrod extending therefrom, said base being mounted to a forward end of said frame and said extendible ramrod opening to the rear of said frame.

7. The pickup truck and said bolt-on removably mounted hoist as defined in claim 1, wherein said first and second rigid links form substantially a right angle when said arm is in said second position.

8. The pickup truck and said bolt-on removably mounted hoist as defined in claim 1, wherein opposing sides of said tetragon are non-parallel.

9. The pickup truck and said bolt-on removably mounted hoist as defined in claim 1, wherein said ram is exterior to said tetragon and extends forwardly therefrom.

10. The pickup truck and said bolt-on removably mounted hoist as defined in claim 1 having two or more extendible rams, each operatively attached to said cantilever arm and said linkage system.

11. A bolt-on hoist unit sized to operatively fit in the bed of a standard pickup truck for loading and unloading objects to and from said pickup truck bed and to and from positions at and significantly lower than ground level;

said hoist unit comprising: a frame, a moving structure system attached to said frame, and a platform movable by said moving structure system;

said frame comprising at least two stringers for mounting adjacent to and overlying said pickup truck bed and presenting a generally flat surface to said pickup truck bed when mounted and defining a substantially horizontal plane;

said frame is removably secured to said pickup truck bed by at least two bolts;

said platform being suitable for carrying one or more objects;

said platform being displaceable between a first position supported on said pickup truck bed and a second position rearwardly and downwardly displaced from said pickup truck bed;

said second position may be near or well below ground level to load or unload said at least one object thereon;

said moving structure comprising a rigid L-shaped dog-legged cantilever arm, an extendable ram, a control unit, hydraulic cylinder, actuator, and a linkage system powered from an electic power supply from said pickup truck; said rigid L-shaped dog-legged cantilever arm moves said platform between said first and second positions and has a first end pivotally mounted to said platform adjacent said upper first end of said platform and has a second end pivotally mounted to a rod extending between two said stringers at a point where said cantelever arm will not engage said pickup truck bed as said cantelever arm moves from said first position to said second position through a range of motion;

a single longitudinally extendible ram having first and second ends;

said first end being pivotally mounted to a forward region of said frame;

said second end indirectly connected to said cantilever arm for rotating said cantilever arm;

said cantilever arm having an approximately 90 degree bend spaced from said first end thereof so that when said platform is in said first position, said cantilever arm extends generally vertically from said pivotal connection to said platform to a point below said platform and above said stringers where said cantilever arm extends generally horizontally below said platform;

said cantilever arm has a second bend spaced from said second end of said cantilever arm to said position of said second end of said cantilever arm at said pivotal attachment at said stringers;

a linkage system for indirectly connecting said second end of said ram to said cantilever arm;

said linkage system comprising first and second elongate rigid links, a first pivot mount joining together said first and second links of said ram about a single axis of rotation, and second and third pivot mounts joining said first and second elongate rigid links to said stringers and said cantilever arm respectively wherein said first and second links, a portion of said cantilever arm and said horizontal plane of said stringers respectively define four sides of a tetragon all four sides of which are pivotal relative to each other;

said ram being positioned fully forward of said rigid links when folded;

said first link being pivotally mounted to said stringers between said ram and said cantilever arm for rotating between a rearwardly leaning position when said ram is fully extended, an intermediate vertical position and a forwardly leaning position when said ram is fully retracted, and said second link directly joining the second end of said ram and said cantilever arm for transmitting force therebetween, said first link being positioned and configured such that in said rearwardly leaning position the angle between said first and second links is about 90 degrees;

said extension and retraction of said ram by said actuator and said control unit actuates said linkage system and said cantilever arm to move said platform between said first and second positions;

an electric control unit controls a hydraulic cylinder of said actuator; and, an electricly operated remote control is housed in a pendant unit which can be operated from plugs placed in a pickup truck cab and at safe positions outside said cab.

* * * * *